(12) United States Patent
Sun

(10) Patent No.: US 9,513,126 B2
(45) Date of Patent: Dec. 6, 2016

(54) AUXILIARY GUIDING DEVICE AND SYSTEM FOR THE BLIND

(71) Applicant: HON HAI PRECISION INDUSTRY CO., LTD., New Taipei (TW)

(72) Inventor: Zong-Yuan Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/678,492

(22) Filed: Apr. 3, 2015

(65) Prior Publication Data

US 2016/0178378 A1 Jun. 23, 2016

(30) Foreign Application Priority Data

Dec. 23, 2014 (CN) .......................... 2014 1 0812074

(51) Int. Cl.
| *G01C 21/10* | (2006.01) |
| *G09B 21/00* | (2006.01) |
| *G08B 1/08* | (2006.01) |
| *G01C 21/00* | (2006.01) |
| *G06K 7/10* | (2006.01) |
| *G01C 21/16* | (2006.01) |
| *G01C 21/20* | (2006.01) |
| *A45B 9/00* | (2006.01) |
| *A45B 3/00* | (2006.01) |

(52) U.S. Cl.
CPC ............... *G01C 21/005* (2013.01); *A45B 3/00* (2013.01); *A45B 9/00* (2013.01); *G01C 21/16* (2013.01); *G01C 21/20* (2013.01); *G06K 7/10316* (2013.01); *G06K 7/10386* (2013.01); *A45B 2009/002* (2013.01)

(58) Field of Classification Search
USPC ....................... 701/500; 434/112; 340/539.13
See application file for complete search history.

(56) References Cited

U.S. PATENT DOCUMENTS

| 2004/0264172 | A1* | 12/2004 | Roberts | A45B 3/04 362/102 |
| 2005/0099291 | A1* | 5/2005 | Landau | A61H 3/061 340/539.13 |
| 2006/0028544 | A1* | 2/2006 | Tseng | A61H 3/061 348/62 |
| 2006/0289624 | A1* | 12/2006 | Olmos | A61F 9/08 235/375 |
| 2007/0238074 | A1* | 10/2007 | Espenlaub | G09B 21/006 434/112 |
| 2008/0004904 | A1* | 1/2008 | Tran | A61B 5/0006 705/2 |
| 2009/0032590 | A1* | 2/2009 | Hopkins | A61H 3/061 235/385 |
| 2009/0191531 | A1* | 7/2009 | Saccocci | G09B 5/062 434/317 |
| 2010/0109918 | A1* | 5/2010 | Liebermann | G10L 15/26 341/21 |
| 2012/0190386 | A1* | 7/2012 | Anderson | G01C 15/04 455/456.3 |
| 2013/0220392 | A1* | 8/2013 | Gassert | A61H 3/061 135/66 |
| 2014/0180173 | A1* | 6/2014 | Sullivan | A61B 5/112 600/595 |
| 2016/0005334 | A1* | 1/2016 | Guo | G09B 21/006 348/62 |

* cited by examiner

*Primary Examiner* — Thomas G Black
*Assistant Examiner* — Tyler Paige
(74) *Attorney, Agent, or Firm* — Zhigang Ma

(57) ABSTRACT

An auxiliary guiding device includes a processor, a storage unit, a data obtaining unit, and an indication unit. The auxiliary guiding device communicates with a radio frequency identification (RFID) tag having an identification number. The storage unit stores navigating information corresponding to the identification number. The data obtaining unit receives the identification number of the RFID tag. The indication unit is directed by the processor to output the navigating information.

12 Claims, 2 Drawing Sheets

AUXILIARY GUIDING DEVICE AND SYSTEM FOR THE BLIND

FIELD

The subject matter herein generally relates to an auxiliary guiding device for the blind, and more particularly to an auxiliary guiding device having a radio frequency identification (RFID) system to assist the blind with navigating information (such as a district or a road name) at a current location.

BACKGROUND

In daily life, the blind have various methods of guidance via touch, such as braille. However, information generated by touch is very limited, and thereby causing inconvenient and insufficient for navigation.

BRIEF DESCRIPTION OF THE DRAWINGS

Implementations of the present technology will now be described, by way of example only, with reference to the attached figure.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an auxiliary guiding device and an auxiliary guiding system using the same.

Figure 1:
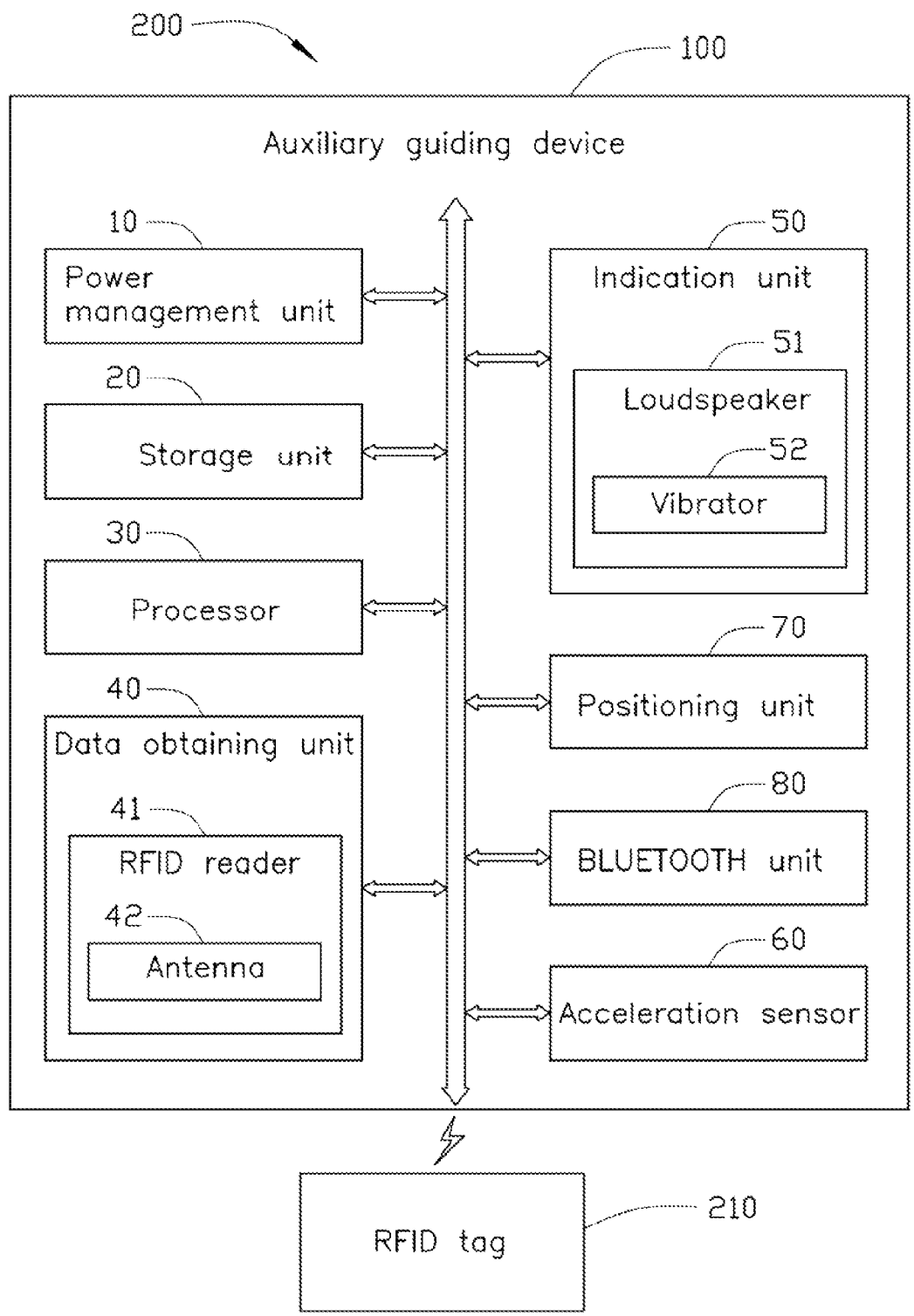
FIG. 1 is a block diagram of an auxiliary guiding system, according to an exemplary embodiment.

FIG. 1 illustrates an embodiment of an auxiliary guiding device 100 employed in an auxiliary guiding system 200, according to an exemplary embodiment. The auxiliary guiding system 200 further comprises a plurality of radio frequency identification (RFID) tags 210.

The RFID tags 210 are located at a predetermined location, such as a tourist spot, for example. Each RFID tag 210 pre-stores an identification number of the predetermined location to be identified by the auxiliary guiding device 100. In at least one embodiment, each RFID tag 210 is sealed in a waterproof case (not shown), and then the watertight case can be embedded in a guiding brick in the predetermined location in order to assist and guide the blind.

Figure 2:
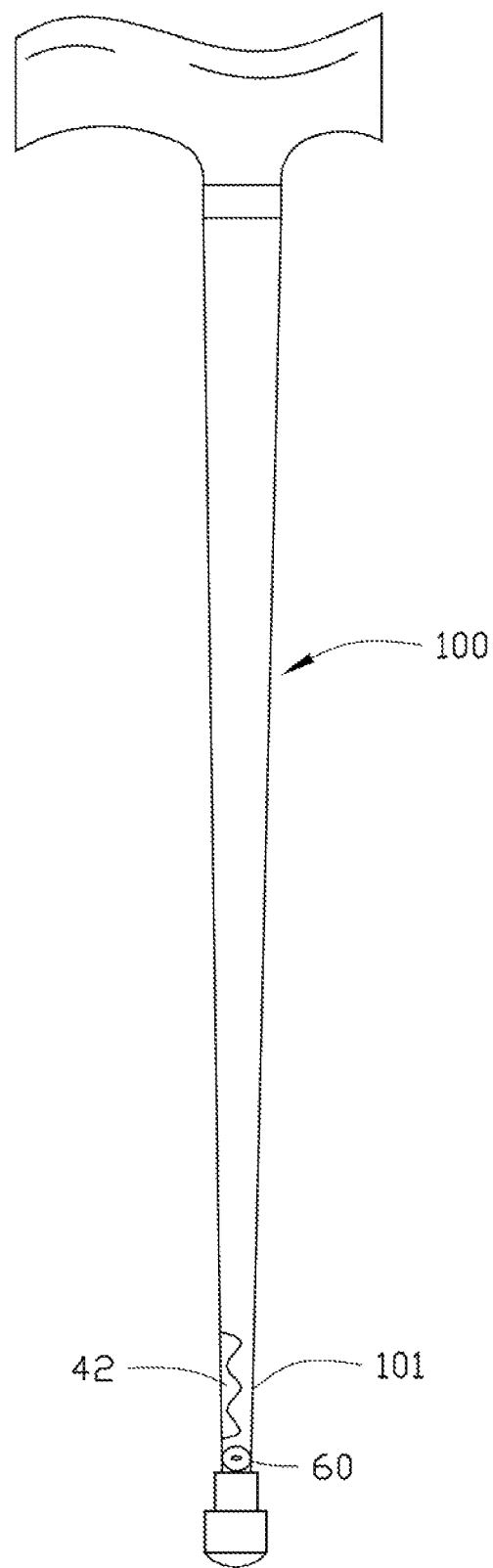
FIG. 2 is a diagrammatic view of an auxiliary guiding device, according to an exemplary embodiment.

Also referring to FIG. 2, in the exemplary embodiment, the auxiliary guiding device 100 is a guiding stick which can be retracted or folded. The auxiliary guiding device 100 includes a power management unit 10, a storage unit 20, a processor 30, a data obtaining unit 40, an indication unit 50, an acceleration sensor 60, a positioning unit 70, and a BLUETOOTH® unit 80. The processor 30 is configured to direct the power management unit 10, the storage unit 20, the data obtaining unit 40, the indication unit 50, the acceleration sensor 60, the positioning unit 70, and the BLUETOOTH® unit 80, details will be illustrated below.

The power management unit 10 can include a rechargeable battery and is configured to provide power to the auxiliary guiding device 100.

The storage unit 20 stores navigating information, such as sound information of a district or a road name in the predetermined location. In addition, the navigating information corresponds to the identification number of the predetermined location.

The data obtaining unit 40 may have a RFID reader 41 comprising an antenna 42. The RFID reader 41 is electronically coupled to the processor 30. The antenna 42 is configured to receive the identification number of the RFID tag 210. In at least one embodiment, the antenna 42 can be an ultra high frequency (UHF) antenna which can operate at about 868 MHz to about 915 MHz, and can be disposed around a bottom end 101 (as close as possible) of the auxiliary guiding device 100 such that the antenna 42 closely approaches the RFID tags 210 embedded in the guiding brick.

The indication unit 50 includes a loudspeaker 51 and a vibrator 52. The loudspeaker 51 is directed by the processor 30 to broadcast the navigating information stored in storage unit 20 by means of speech when the identification number of the RFID tag 210 corresponding to the navigating information is received by the data obtaining unit 40. When another identification number is received by the data obtaining unit 40, the processor 30 turns on the vibrator 52 to vibrate for indicating changes of the district or the road name.

The acceleration sensor 60 is configured to detect whether the auxiliary guiding device 100 is using. In detail, the acceleration sensor 60 is disposed on the bottom end 101 of the auxiliary guiding device 100. When the auxiliary guiding device 100 contacts the ground at an inconstant accelerating rate, the acceleration sensor 60 detects the inconstant accelerating rate and outputs a sensing signal to the processor 30. Thus, the processor 30 turns on the data obtaining unit 40 in response to the sensing signal. If the acceleration sensor 60 does not detect the inconstant accelerating rate for a period of time, the processor 30 turns off the data obtaining unit 40 for conserving power. At this time, the auxiliary guiding device 100 may be not in use.

The positioning unit 70 is configured to send positioning information of the auxiliary guiding device 100 to a terminal device (for example, a mobile phone) for tracking the blind. In at least one embodiment, the positioning unit 70 is a global positioning system (GPS) module.

The BLUETOOTH® unit 80 is mated with a BLUETOOTH® earphone (not shown) worn on the blind to transmit the navigating information broadcasted by the loudspeaker 51 to the BLUETOOTH® earphone.

In use, when the auxiliary guiding device 100 contacts the ground at an inconstant accelerating rate, the acceleration sensor 60 outputs the sensing signal to the processor 30. The processor 30 turns on the data obtaining unit 40 for receiving the identification number of the RFID tag 210. At this time, the processor 30 controls the loudspeaker 51 to broadcast the navigating information stored in storage unit 20 by means of speech. If another identification number is received by the data obtaining unit 40, the processor 30 turns on the vibrator 52 to vibrate for indicating changes of the district or the road name.

In summary, the RFID tags 210 are embedded in the guiding brick of the predetermined location. The acceleration sensor 60 outputs the sensing signal to activate the data obtaining unit 40, thus, the data obtaining unit 40 receives the identification number of the RFID tag 210 and indication unit 50 broadcasts the navigating information corresponding to the identification number. The auxiliary guiding system 200 provides the auxiliary guiding device 100 for the blind, and thus broadcasts the navigating information to assist and guide the blind for safe navigation.

The embodiments shown and described above are only examples. Many details are often found in the art such as the other features of the auxiliary guiding device and the auxiliary guiding system using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An auxiliary guiding device in communication with a radio frequency identification (RFID) tag having an identification number, the auxiliary guiding device comprising:
   a processor;
   a storage unit coupled to the processor and configured to store navigating information corresponding to the identification number;
   a data obtaining unit coupled to the processor and configured to receive the identification number of the RFID tag;
   an indication unit directed by the processor to output the navigating information; and
   an acceleration sensor, wherein when the auxiliary guiding device contacts the ground at an inconstant accelerating rate, the acceleration sensor detects the inconstant accelerating rate and outputs a sensing signal to the processor, the processor turns on the data obtaining unit in response to the sensing signal.

2. The auxiliary guiding device as claimed in claim 1, wherein if the acceleration sensor does not detect the inconstant accelerating rate for a period of time, the processor turns off the data obtaining unit.

3. The auxiliary guiding device as claimed in claim 1, wherein the data obtaining unit comprises a RFID reader having an antenna, the RFID reader is electronically coupled to the processor, and the antenna receives the identification number of the RFID tag.

4. The auxiliary guiding device as claimed in claim 3, wherein auxiliary guiding device is a guiding stick.

5. The auxiliary guiding device as claimed in claim 4, wherein both the antenna and the acceleration sensor are dispose on a bottom end of the guiding stick.

6. The auxiliary guiding device as claimed in claim 1, wherein the indication unit comprises a loudspeaker and a vibrator, the loudspeaker broadcasts the navigating information by means of speech, and the vibrator vibrates in response to changes of the identification number.

7. An auxiliary guiding system, comprising:
   a radio frequency identification (RFID) tag embedded in a predetermined location and having an identification number; and
   an auxiliary guiding device communicating with the RFID tag, the auxiliary guiding device comprising:
     a processor;
     a storage unit coupled to the processor and configured to store navigating information of the predetermined location, the navigating information corresponding to the identification number;
     a data obtaining unit coupled to the processor and configured to receive the identification number of the RFID tag;
     an indication unit directed by the processor to output the navigating information; and
     an acceleration sensor, wherein when the auxiliary guiding device contacts the ground at an inconstant accelerating rate, the acceleration sensor detects the inconstant accelerating rate and outputs a sensing signal to the processor, the processor turns on the data obtaining unit in response to the sensing signal.

8. The auxiliary guiding system as claimed in claim 7, wherein if the acceleration sensor does not detect the inconstant accelerating rate for a period of time, the processor turns off the data obtaining unit.

9. The auxiliary guiding system as claimed in claim 8, wherein the data obtaining unit comprises a RFID reader having an antenna, the RFID reader is electronically coupled to the processor, and the antenna receives the identification number of the RFID tag.

10. The auxiliary guiding system as claimed in claim 7, wherein auxiliary guiding device is a guiding stick.

11. The auxiliary guiding system as claimed in claim 10, wherein both the antenna and the acceleration sensor are dispose on a bottom end of the guiding stick.

12. The auxiliary guiding system as claimed in claim 7, wherein the indication unit comprises a loudspeaker and a vibrator, the loudspeaker broadcasts the navigating information by means of speech, and the vibrator vibrates in response to changes of the identification number.

* * * * *